United States Patent
Mori et al.

(10) Patent No.: US 10,394,736 B2
(45) Date of Patent: Aug. 27, 2019

(54) I/O MODULE, SETTING DEVICE, AND METHOD OF BUILDING PROCESS CONTROL SYSTEM

(71) Applicant: YOKOGAWA ELECTRIC CORPORATION, Musashino-shi, Tokyo (JP)

(72) Inventors: Hiroshi Mori, Tokyo (JP); Nobuaki Ema, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 800 days.

(21) Appl. No.: 14/881,910

(22) Filed: Oct. 13, 2015

(65) Prior Publication Data
US 2016/0110304 A1 Apr. 21, 2016

(30) Foreign Application Priority Data
Oct. 21, 2014 (JP) ................................. 2014-214364

(51) Int. Cl.
*G06F 13/362* (2006.01)
*G06F 13/40* (2006.01)
*G05B 19/042* (2006.01)

(52) U.S. Cl.
CPC ....... *G06F 13/362* (2013.01); *G05B 19/0423* (2013.01); *G06F 13/4027* (2013.01); *G06F 13/4068* (2013.01); *G05B 2219/1138* (2013.01)

(58) Field of Classification Search
CPC ...... G05B 19/4185; G05B 2219/25428; G05B 2219/31121
USPC .......................................................... 710/316
See application file for complete search history.

(56) References Cited

U.S. PATENT DOCUMENTS

| 5,903,455 | A | * | 5/1999 | Sharpe, Jr. | G05B 19/0423 700/17 |
| 6,047,222 | A | * | 4/2000 | Burns | G05B 19/4184 700/2 |
| 7,010,294 | B1 | * | 3/2006 | Pyotsia | G05B 19/042 340/3.1 |
| 2005/0075817 | A1 | * | 4/2005 | Kah | F16K 31/1262 702/108 |
| 2006/0241913 | A1 | * | 10/2006 | De Groot | G05B 19/0428 702/188 |
| 2010/0033192 | A1 | * | 2/2010 | Somfalvy | F15B 19/005 324/555 |
| 2010/0259101 | A1 | * | 10/2010 | Micallef | G01D 21/00 307/26 |
| 2011/0010476 | A1 |  | 1/2011 | Kreider et al. | |

(Continued)

FOREIGN PATENT DOCUMENTS

EP 2618227 A1 7/2013
JP 2004-220495 A 8/2004
(Continued)

*Primary Examiner* — Titus Wong
(74) *Attorney, Agent, or Firm* — Sughrue Mion, PLLC (57) ABSTRACT

Provided is an I/O module including: a first interface including connectors each of which is connected to a field device; a second interface connected to a controller that controls the field device; a third interface connected to an external setting device that outputs a setting instruction; and a setting adjustor configured to set tag information, which identifies each of the connectors, to each of the connectors based on the setting instruction input from the setting device via the third interface.

21 Claims, 7 Drawing Sheets

(56) References Cited

U.S. PATENT DOCUMENTS

2013/0138672 A1     5/2013   Wasserman
2014/0032972 A1*   1/2014   Ramachandra .... G05B 19/0425
                                                                               714/37

FOREIGN PATENT DOCUMENTS

| JP | 2006338688 A | 12/2006 |
| JP | 2012-208694 A | 10/2012 |
| JP | 2013-197954 A | 9/2013 |

\* cited by examiner

| I/O TAG | P&ID TAG | I/O TYPE | COMMUNICATION MODE | DEVICE ADDRESS | DEVICE MODEL NAME | CHANNEL INFORMATION |
|---|---|---|---|---|---|---|
| I/O-1 | TI100 | AI | 4-20mA | 00:AA:BB:CC | AB123 | 1-1 |
| I/O-2 | FI200 | AI | HART | 01:02:03:04 | CD456 | 2-3 |
| I/O-3 | FO300 | DO | FF | 01:02:05:06 | EF789 | 2-4 |
| ⋮ | ⋮ | ⋮ | ⋮ | ⋮ | ⋮ | ⋮ |

| I/O TAG | P&ID TAG | DEVICE TYPE | I/O TYPE | RANGE | ENGINEERING UNIT |
|---|---|---|---|---|---|
| I/O-A | TI100 | TEMPERATURE MEASUREMENT | AI | 0-100 | °C |
| I/O-B | FI200 | FLOW MEASUREMENT | AI | 100-200 | PSI |
| I/O-C | FO300 | FLOW ADJUSTMENT | DO | 100-200 | PSI |
| ⋮ | ⋮ | ⋮ | ⋮ | ⋮ | ⋮ |

I/O MODULE, SETTING DEVICE, AND METHOD OF BUILDING PROCESS CONTROL SYSTEM

BACKGROUND OF THE INVENTION

Field of the Invention

The present invention relates to an I/O module, a setting device, and a method of building a process control system.

Priority is claimed on Japanese Patent Application No. 2014-214364, filed Oct. 21, 2014, the contents of which are incorporated herein by reference.

Description of Related Art

In a plant, a factory or the like, a process control system for controlling various state quantities (for example, pressure, temperature, flow rate, or the like) in an industrial process has been built, and a high level of automated execution has been implemented. In such a process control system, generally, on-site devices called field devices (such as a measuring device, an actuator, or the like) are connected to a controller via an I/O module. The controller controls a manipulation device (for example, actuator) based on the measurement result of a measuring device (for example, sensor) to control the various state quantities described above.

Such process control systems are generally constructed through the following three inspection/testing procedures.
(i) FAT (Factory Acceptance Test)

FAT (Factory Acceptance Test) for hardware and software is performed on various devices (such as the above-described field device, I/O module, controller, or the like), which constitutes the process control system, before they are shipped from the factory.
(ii) SAT (Site Acceptance Test)

SAT (Site Acceptance Test) is performed to verify whether or not the above-described various devices, which have been installed to the plant or the like, have a required functionality, performance or the like. Specifically, it is verified whether or not equipment, installation and wiring of the above-described various devices are performed normally. Then, it is verified (checked) whether or not connections in the plant or the like are made correctly. Also, setting and adjustment of the various devices, signal checking between the I/O module the field device, or the like are performed.
(iii) SIT (System Integration Test)

SIT (System Integration Test) is performed to verify whether or not the process control system built in the plant or the like works as it is designed as a whole. Specifically, signal checking between a manipulation monitoring terminal arranged at the upper side of the controller and the I/O module, signal checking between the manipulation monitoring terminal and the field device, or the like are performed.

When the above-described procedures are completed, commissioning of the process control system built in the plant or the like is performed. When the commissioning is normally completed, operation of the process control system is shifted to a full-scale operation. Japanese Unexamined Patent Application, First Publication No. 2012-208694 discloses an art of easily checking a connection state, a commissioning state, and an operation state (analog input/output) of the field device and verifying the progress state of the checking using a device monitoring unit arranged at the upper side of the controller.

The route between the controller and the field devices is determined when the control program used in the process control system is designed in the above-described FAT. Also, the wiring work and the verification work to verify whether or not wirings are correctly connected in the above-described SAT are performed along the route that is determined when the control program is designed in FAT. Therefore, in the conventional art, the above-described FAT, SAT and SIT should be performed in this order, thereby, it takes a long time to build the process control system.

Though depending on the size of the plant, it takes one or two years that the full-scale operation of the plant including the process control system is started since the plant design (the specification design of the plant including the process control system to be built) is completed. Moreover, it takes about three months to complete the above-described three procedures (FAT, SAT and SIT).

The main settings for the device arranged at the upper side of the controller are logical settings relating to the process control. On the other hand, the main settings and verification of devices such as the field device and the I/O module are settings of the measurement range and physical settings of the verification of measurement/operation accuracy or the like in the measurement range. Therefore, if it is possible to perform the above-described procedures in parallel, it is possible to shorten the time required for the above-described three procedures and to accelerate the full-scale operation of the plant including the process control system by the amount of the shortened time.

The present invention provides an I/O module, a setting device, and a method of building a process control system that are capable of shortening the time of building a process control system.

SUMMARY OF THE INVENTION

An I/O module may include: a first interface including connectors each of which is connected to a field device; a second interface connected to a controller that controls the field device; a third interface connected to an external setting device that outputs a setting instruction; and a setting adjustor configured to set tag information, which identifies each of the connectors, to each of the connectors based on the setting instruction input from the setting device via the third interface.

The setting adjustor may perform a setting relating to an input/output of each of the connectors by using the tag information based on the setting instruction input from the setting device via the third interface.

Each of the conneters may be set to perform one of an input of an analogue signal from the field device, an output of an analogue signal to the field device, an input of a digital signal from the field device, and an output of a digital signal to the field device, based on the setting instruction input from the setting device.

The setting adjustor may perform a setting of the field device connected to the connector, to which the setting has been performed, by using the tag information based on the setting instruction input from the setting device via the third interface.

The I/O module may further include: a tester configured to verify a state of the field device, to which the setting has been performed, by using the tag information based on a verification instruction input from the setting device via the third interface.

The I/O module may further include: an interceptor configured to intercept an instruction input from the setting device via the third interface or an instruction input from the controller via the second interface, based on an instruction input from the controller via the second interface or an instruction input from the setting device via the third interface.

The I/O module may further include: a first switch that switches a connection between the second interface and the setting adjustor and between the second interface and the tester to an ON state or an OFF state; a second switch that switches a connection between the third interface and the setting adjustor and between the third interface and the tester to an ON state or an OFF state; and an on-off setting adjustor that sets one of the first switch and the second switch to an ON state and the other of the first switch and the second switch to an OFF state, based on an instruction input from the controller via the second interface or an instruction input from the setting device via the third interface.

The I/O module may further include: a memory that stores the tag information that has been set to each of the connectors.

A setting device may be connected to the I/O module. The setting device may include: a lower interface connected to the third interface of the I/O module; a storage that stores setting information relating to a transmission between the field device and the I/O module; and an instructor that instructs a setting of at least one of the I/O module and the field device via the lower interface by using the setting information stored in the storage.

The setting device may further include: a checker that verifies a state of the filed device, which is connected to the I/O module, via the lower interface.

The storage may further store check information that defines an item to be verified about the field device and a procedure. The checker may verify the state of the field device according to the check information stored in the storage.

The checker may make history information by adding time information, which indicates a time when the state of the field device has been verified, to verification information, which has been acquired by verifying the state of the filed device, and stores the history information in the storage.

The checker may control displaying or notifying the outside of progress information that indicates a verification state of the filed device.

The setting information may include: a first setting information in which the tag information, which is set to each of the connectors arranged on the first interface of the I/O module, is made to correspond with input/output information of the field device connected to the connector; and a second setting information in which tag information, which is used in the controller to logically identify each of the connectors, is made to correspond with input/output information of the connector.

The setting device may further include: a combiner that combines the input/output information of the connector and the input/output information of the field device, by creating correspondence between the tag information included in the first setting information and the tag information included in the second setting information.

The setting device may further include: an upper interface connected to an upper device or an off-line device. The setting information to be stored in the storage may be acquired from the upper device via the upper interface.

A method of building a process control system that controls an industrial process may include: a first step of installing the I/O module and the field device in a field and installing wirings between them, and setting the I/O module and the field device by using the setting device connected to the I/O module.

In the first step, each of a plurality of I/O modules connected to field devices may be connected to the setting device, and settings of the plurality of I/O modules and the field devices may be performed together in parallel or individually.

The method may further include: a second step of designing the controller that controls the field device by using tag information for logically identifying each of the connectors arranged in the first interface of the I/O module, the second step being performed independent from the first step; a third step of installing the controller designed in the second step in the field and connecting the controller to the I/O module, and creating correspondence between tag information used in the controller and tag information that has been set in the I/O module.

DETAILED DESCRIPTION OF THE INVENTION

An I/O module, a setting device, and a method of building a process control system in accordance with a preferred embodiment of the present invention will be described in reference to figures.

(Process Control System)

Figure 1:
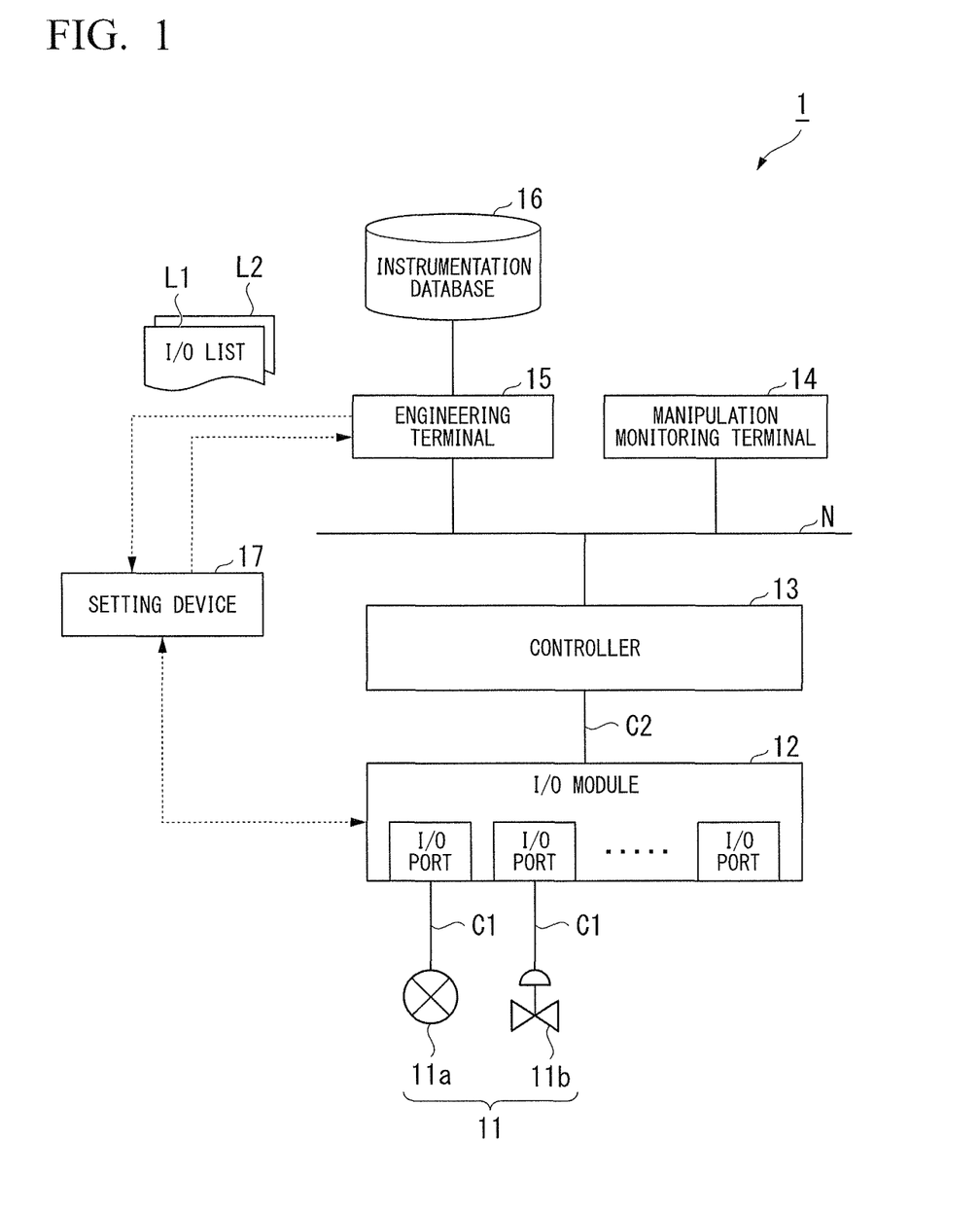
FIG. 1 is a block diagram illustrating a total configuration of a process control system in accordance with an embodiment of the present invention.

FIG. 1 is a block diagram illustrating a total configuration of a process control system in accordance with an embodiment of the present invention. As illustrated in FIG. 1, the process control system 1 includes field devices 11, an I/O module 12, a controller 13, a manipulation monitoring terminal 14, an engineering terminal 15 and an instrumentation database 16. The controller 13 controls the field device 11 according to the instruction from the manipulation monitoring terminal 14 or the like, thereby, the industrial process achieved by the plant (not illustrated) is controlled. Various settings of the I/O module 12 and the field device 11 are performed by a setting device 17 (details will be described below), thereby, the process control system 1 is built.

The field device 11 and the I/O module 12 are connected to a transmission line C1, and the I/O module 12 and the controller 13 are connected to a cable C2. Also, the controller 13, the manipulation monitoring terminal 14, the engineering terminal 15, and the instrumentation database 16 are connected to a control network N. The control network N is, for example, a network that connects between the site of the plant and the monitoring room.

The field device 11 is, for example, a sensor device such as a flow meter, a temperature sensor, or the like, a valve device such as a flow control valve, an on-off valve, or the like, an actuator device such as a fan, a motor, or the like, and other devices installed in the plant. In this embodiment, to facilitate understanding, a case in which the state quantity to be controlled in the industrial process is the flow rate of the fluid will be described as an example. In FIG. 1, a sensor device 11*a* for measuring the flow rate of the fluid and a valve device 11*b* for controlling (operating) the flow rate of the fluid are illustrated among the plurality of field devices 11.

The I/O module 12 is provided between the field device 11 and the controller 13. A plurality of field devices 11 can be connected to the I/O module 12. The I/O module 12 performs the signal processing of signals transmitted between the field device 11 and the controller 13. For example, in the signal processing, a signal obtained from the field device 11 is converted into a signal that can be received by the controller 13. The plurality of field devices 11 are connected to the controller 13 via the I/O module 12. In other words, the I/O module 12 is a module that relays between the signal input/output by the field device 11 and the signal input/output by the controller 13. Details of the I/O module 12 will be described below.

The controller 13 controls the field device 11 by communicating with the field device 11 in accordance with the instruction from the manipulation monitoring terminal 14 or the like. Specifically, the controller 13 acquires a process value measured by the field device 11 (for example, the sensor device 11*a*). Then, the controller 13 calculates an operation amount for operating the other field device 11 (for example, the valve device 11*b*) and transmits the operation amount to the other field device 11 (for example, the valve device 11*b*). Thereby, the controller 13 controls the other field device 11 (for example, a valve device 11*b*).

The manipulation monitoring terminal 14 is a terminal used for monitoring the process operated by a plant operator, for example. Specifically, the manipulation monitoring terminal 14 acquires input/output data of the field device 11 from the controller 13, communicates the behavior of the field device 11 and the controller 13, which constitute the process control system 1, to the operator, and controls the controller 13 based on the instruction by the operator.

The engineering terminal 15 generates information to be set to the field device 11, the I/O module 12 and the controller 13 based on the design information (the design information of the plant including the process control system 1) stored in the instrumentation database 16. I/O lists L1 and L2 (setting information: details will be described later) that are information relating to the transmission between the field device 11 and the I/O modules 12 are examples of the information generated by the engineering terminal 15. The instrumentation database 16 stores the above-described design information to be referenced in the engineering terminal 15.

The setting device 17 performs various settings to the field device 11 and the I/O module 12 when building the process control system 1 by using the I/O lists L1 and L2 acquired from the engineering terminal 15. In the present embodiment, even when the controller 13 is not connected to the I/O module 12, setting and adjustment of the field device 11 and the I/O module 12, the connection test between the field devices 11 and the I/O modules 12, or the like can be performed by using the setting device 17. Details of the setting device 17 will be described later.

(I/O module)

Figure 2:
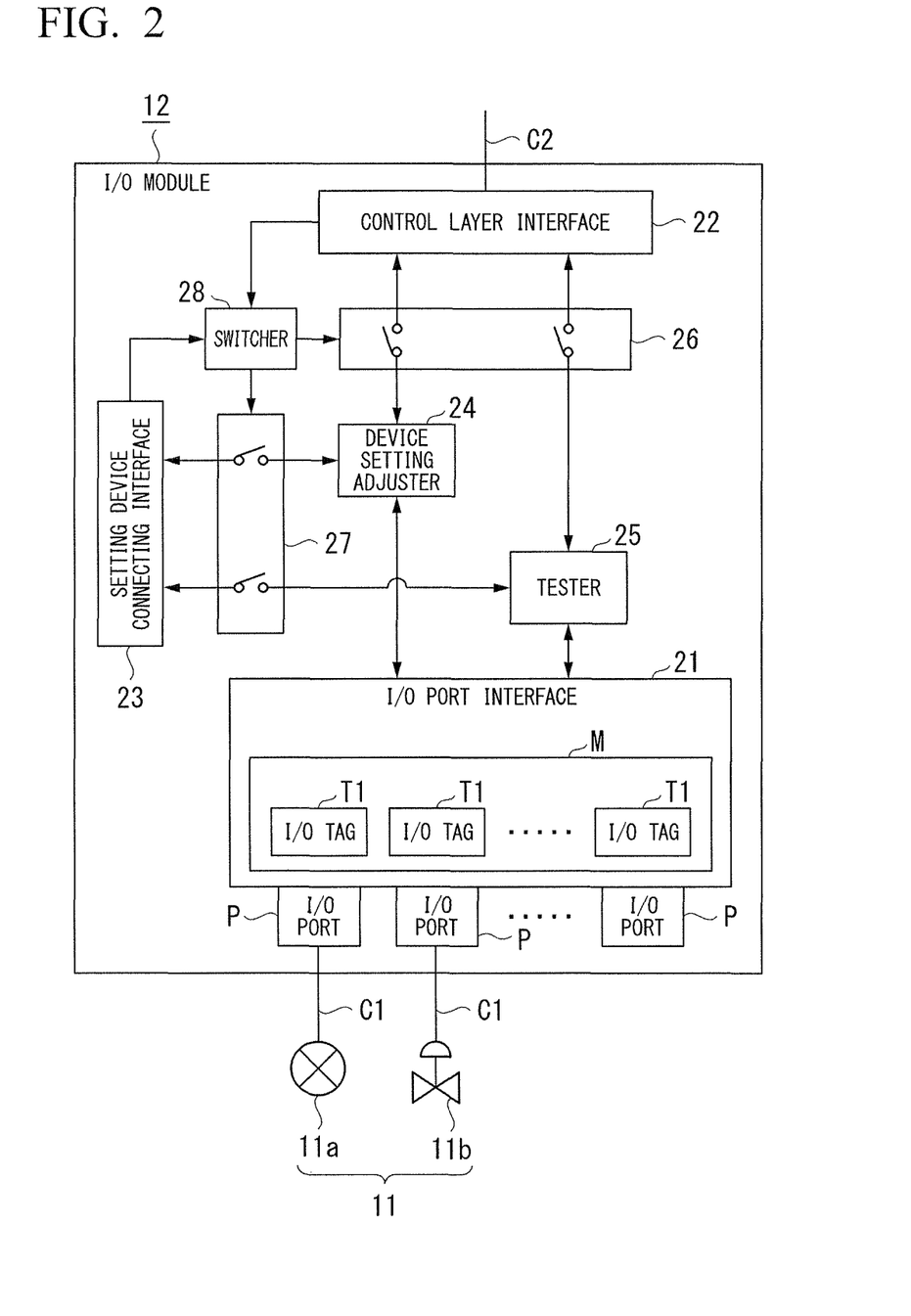
FIG. 2 is a block diagram illustrating a main configuration of the I/O module in accordance with an embodiment of the present invention.

FIG. 2 is a block diagram illustrating a main configuration of the I/O module in accordance with an embodiment of the present invention. As illustrated in FIG. 2, the I/O module 12 includes an I/O port interface 21 (a first interface), a control layer interface 22 (a second interface), a setting device connection interface 23 (a third interface), a device setting adjustor 24 (a setting adjustor), a tester 25, and a switch 26 (an interceptor, a first switch), a switch 27 (an interceptor, a second switch), and a switcher 28 (an interceptor, an on-off setting adjustor).

The I/O port interface 21 has a plurality of I/O ports P (connectors) that are connected to the field device 11 and transmits/receives various signals to/from the field device 11 connected to the I/O port P. The I/O port interface 21 includes a memory M that stores an I/O tag T1 (tag information) that is set to each I/O port P by the device setting adjustor 24 based on the instruction from the setting device 17.

The I/O port P can perform an input of an analog signal from the field device 11, an output of the analog signal to the field device 11, an input of a digital signal from the field device 11 (a discrete input), and an output of the digital signal to the field devices 11 (a discrete output). Which of the above-described input or output is performed by the I/O port P is set by the device setting adjustor 24 based on the instruction from the setting device 17.

The control layer interface 22 is connected to the cable C2, and transmits/receives various signals to/from the controller 13 provided in the control layer via the cable C2. The setting device connection interface 23 transmits/receives various signals to/from the setting device 17, which is connected to the setting device connection interface 23 via a connecting cable (not illustrated) or connected wirelessly. The setting device connection interface 23 may be a wired interface such as USB (Universal Serial Bus), Ethernet (registered trademark), or the like, or may be a wireless interface compliant with the wireless communication standards such as Wi-Fi (registered trademark), Bluetooth (registered trademark), or the like.

The device setting adjustor 24 performs various settings to the I/O port interface 21 and various settings to the field device 11 based on the setting instruction from the setting device 17 input via the setting device connection interface 23 or the setting instruction from the controller 13 input via the control layer interface 22. For example, the device setting adjustor 24 sets the I/O tag T1 to each I/O port P based on the setting instruction from the setting device 17 input via the setting device connection interface 23.

Also, the device setting adjustor 24 performs a setting related to input/output of the I/O port P using the above-described I/O tag T1 based on the setting instruction from the setting device 17 input via the setting device connection interface 23. Specifically, the device setting adjustor 24 performs a setting of each I/O port P to perform either of the input of the analog signal from the field device 11, the output of the analog signal to the field device 11, the input of the digital signal from the field device 11, and the output of the digital signal to the field device 11.

Also, the device setting adjustor 24 performs a setting of the field device 11, which is connected to the I/O port P to which the above-described setting has been performed, based on the setting instruction from the setting device 17 input via the setting device connection interface 23 using the above-described I/O tag T1. The setting made to the field device 11 is, for example, a setting of a unique address in each field device 11 (device address), a setting of a specific operating condition for each field device 11, or the like.

The tester 25 performs a verification test of verifying a state of the I/O port P and the field device 11 when receiving a verification instruction from the setting device 17 via the setting device connection interface 23 or receiving a verification instruction from the controller 13 via the control layer interface 22. For example, the tester 25 performs a verification test that verifies whether or not the setting relating to input/output of the I/O port P is performed normally, whether or not the connection between the I/O port P and the field device 11 has been performed normally, or the like.

The verification test to verify the state of the I/O port P and the field device 11 may be performed mainly by the setting device 17 (details will be described later). As such, when the setting device 17 mainly performs the verification test, the tester 25 itself does not perform the verification test but performs only the relay of the various signals transmitted between the setting device 17 and the I/O port interface 21. For example, a test signal from the setting adjustor 17 is output to the I/O port interface 21, and a signal indicating the result of the verification test acquired by the I/O port interface 21 is output to the setting device connection interface 23 connected to the setting device 17.

The switch 26 switches a connection between the control layer interface 22 and the device setting adjustor 24/the tester 25 to an ON state or an OFF state in accordance with an instruction from the switching adjustor 28. The switch 27 switches a connection between the setting device connection interface 23 and the device setting adjustor 24/the tester 25 to an ON state or an OFF state in accordance with an instruction from the switching section 28. The switches 26 and 27 may be a mechanical switch or may be a switch implemented by software.

The switching adjustor 28 switches one of the switches 26 and 27 to an OFF state and the other of the switches 26 and 27 to an ON state in accordance with an instruction from the controller 13 input via the control layer interface 22 or an instruction from the setting device 17 input via the setting device connection interface. That is, the switches 26 and 27 and the switching adjustor 28 exclusively shut off an interaction between an instruction from the controller 13 input via the control layer interface 22 and an instruction from the setting device 17 input via the setting device connection interface 23.

That is, the switches 26 and 27 and the switching adjustor 28 block an instruction from the setting device 17 input via the setting device connection interface 23, based on an instruction from the controller 13 input via the control layer interface 22. Alternatively, the switches 26 and 27 and the switching adjustor 28 block an instruction from the controller 13 input via the control layer interface 22, based on an instruction from the setting device 17 input via the setting device connection interface 23. By adopting these configurations, it is possible to prevent one of the instruction from the controller 13 and the instruction from the setting device 17 from affecting influence to the other of the instruction from the controller 13 and the instruction from the setting device 17.

(Setting Device)

Figure 3:
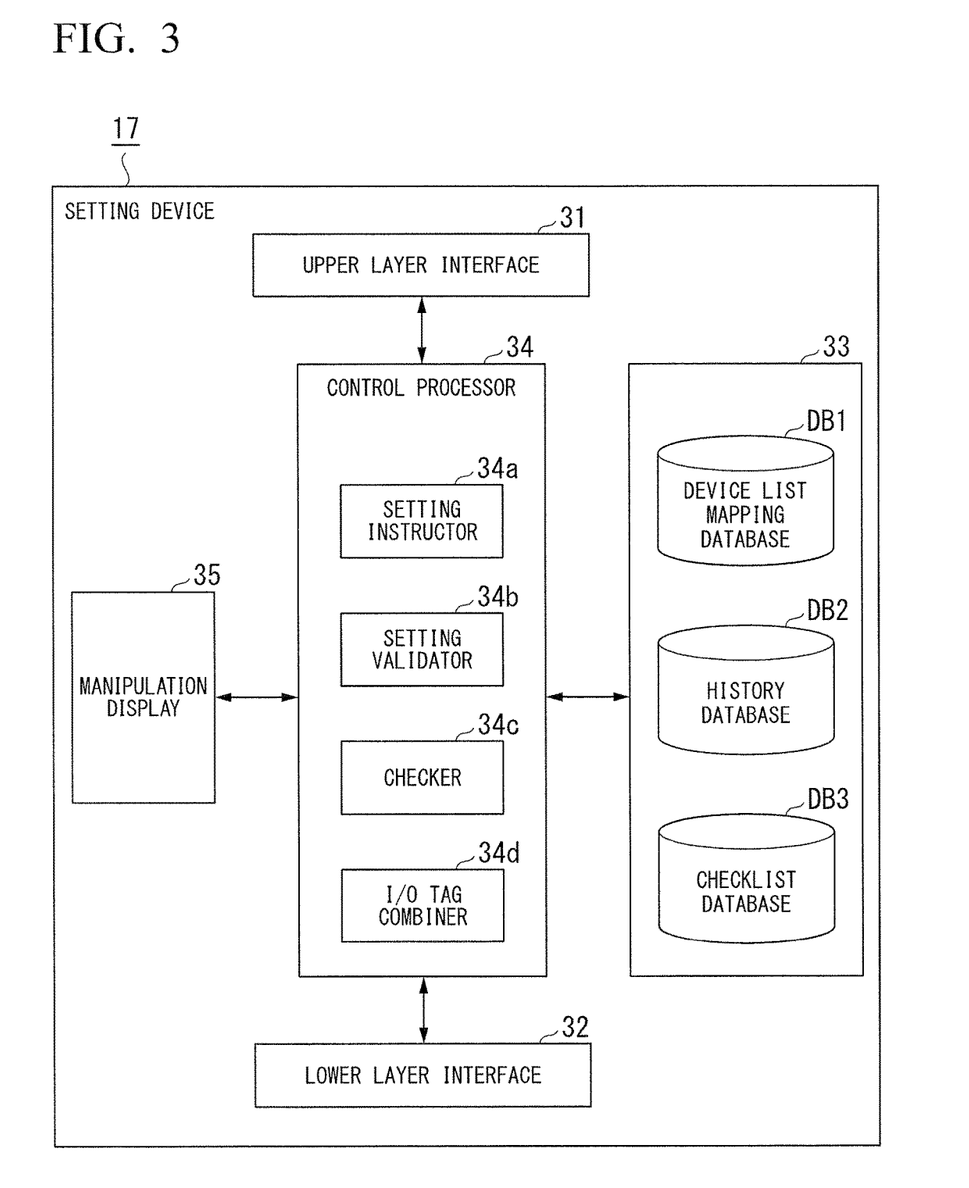
FIG. 3 is a block diagram illustrating a main configuration of a setting device in accordance with an embodiment of the present invention.

FIG. 3 is a block diagram illustrating a main configuration of a setting device in accordance with an embodiment of the present invention. As illustrated in FIG. 3, a setting device 17 includes an upper layer interface 31 (an upper interface), a lower layer interface 32 (a lower interface), a storage 33, a control processor 34, and a manipulation display 35. The above-described setting device is achieved by, for example, a desktop or laptop personal computer.

The upper layer interface 31 is connected to the engineering terminal 15 (higher-level device) which is positioned at the upper side of the controller 13 and transmits/receives various information to/from the engineering terminal 15. For example, the upper layer interface 31 receives from the engineering terminal 15 the I/O lists L1 and L2 (see FIG. 1) that are information relating to the transmission between the field device 11 and the I/O modules 12. The upper layer interface 31 may be connected directly to the engineering terminal 15 or may be indirectly connected to the engineering terminal 15 via the control network N. Further, the upper layer interface 31 may be connected to the engineering terminal 15 which is in an offline state.

The lower layer interface 32 is connected to the setting device connecting interface 23 of the I/O module 12 and transmits/receives various information to/from the I/O module 12. The lower layer interface 32A may be a wired interface or may be a wireless interface may be used as, which is similar to the setting device connecting interface 23 provided in the I/O module 12 as described above.

The storage 33 includes an external storage device such as a hard disk, for example, and stores a device list mapping database DB1, a history database DB2 (history information), and a check list database DB30 (check information). Here, the device list mapping database DB1 is a database storing various setting values (a design setting value and an actual setting value) for the field device 11 and the I/O module 12, wiring information indicating the wiring of the field device 11 and the I/O module 12, position information indicating the position of the field device 11 and the I/O module 12, or the like.

The history database DB2 is a database storing a work history of the field device 11 and the I/O module 12 (a history in which each specific work content is associated with the time and the date when the work has been performed). The history database DB2 stores, for example, information obtained by performing the verification test of the state of the I/O port P and the field device 11 (verification information) and information indicating the time at which the verification test has been performed (time information) which is associated with the verification information.

The checklist database DB3 is a database storing items to be verified for the field device 11 or the I/O module 12 (check items), information (check information) that defines the procedures of the verification (check procedure), and the result of the verification. The checklist database DB3 stores, for example, "input check", "output check", "input loop check", and "output loop check" as the above-described check items. "Input check" and "output check" described above are items for verifying the type of input/output signals (current input, pulse input, mV input, thermocouple input, or the like).

The control processor 34 controls to oversee the operation of the setting device 17 and performs a necessary processing for performing various settings of the field device 11 and the I/O module 12. The control processor 34 includes a setting instructor 34a (instructor), a setting validator 34b, a checker 34c, and an I/O tag combiner 34d (a combiner). The setting instructor 34a performs the setting instruction for the I/O module 12 and the field device 11 described above via the lower layer interface 32 by using information of each database stored in the storage 33.

The setting validator 34b performs the verification instruction to the I/O module 12 and the field device 11 described above via the lower layer interface 32. Also, the setting validator 34b compares the information, which is acquired from the lower layer interface 32 by performing the above-described verification instruction, with information in each database stored in the storage 33. Then, the setting validator 34b displays the comparison result on the manipulation display 35 or notifies the comparison result to the engineering terminal 15 via the upper layer interface 31.

The checker 34c performs the verification test of verifying the state of the I/O port P and the field device 11 in the same manner as the tester 25 of the I/O module 12 performs the verification test. Specifically, the checker 34c performs the verification test of verifying the state of the I/O port P and the field device 11 based on the check information stored in the check list database DB3 of the storage 33. For example, the checker 34c performs the verification test regarding whether or not setting of input/output of the I/O port P is normal, whether or not the connection between the I/O port P and the field device 11 has been performed normally, or the like.

Also, the checker 34c stores in the history database DB2 the information acquired by performing the verification test of verifying the state of the I/O port P and the field device 11 (verification information) and the information indicating the time at which the verification test has been performed (time information) that is associated with the verification information. By storing such information in the history database DB2, the history database DB2 can record what kind of verification test has been performed on the I/O port P and the field device 11 and what result has been acquired by the verification test.

Also, the checker 34c makes the progress information indicating the state of the verification test of verifying the state of the I/O port P and the field device 11 displayed on the manipulation display 35 or notified to the external (for example, engineering terminal 15) from the upper layer interface 31. The above-described verification test may be performed in parallel for a plurality of I/O modules 12 (details will be described later). The progress information is displayed on the manipulation display 35, thereby, it is possible to grasp the state of the verification test for the I/O module 12 and the field device 11 connected to the setting device. Further, the progress information is notified to the external (for example, the engineering terminal 15), thereby, it is possible to grasp the state of the verification test (the verification test for a plurality of I/O modules 12 and field devices 11) of the entire (or in the target range).

The I/O tag combiner 34d makes correspondence between the I/O tag T2 used in the controller 13 (see FIG. 4B) and the I/O tag T1 set to each I/O port P of the I/O module 12. The above-described I/O tag T1 is included in the I/O list L1 illustrated in FIG. 1, and the above-described I/O tag T2 is included in the I/O list L2 illustrated in FIG. 1 (details will be described later). The I/O tag combiner 34d makes correspondence between the I/O tags T1 and T2, thereby, the input/output information 11 on the I/O port P and the input/output information J2 on the field device 11 connected to the I/O port P are combined.

The manipulation display 35 includes, for example, a touch panel type liquid crystal display device having both a display function and a manipulation function. The manipulation display 35 displays various information output from the control processor 34 and outputs a manipulation signal corresponding to the manipulation to the control processor 34 if a manipulation is performed on a display surface of the liquid crystal display device. In the manipulation display 35, a display function and a manipulation function may be physically separated such as a liquid crystal display device and a keyboard.

Figure 4A:
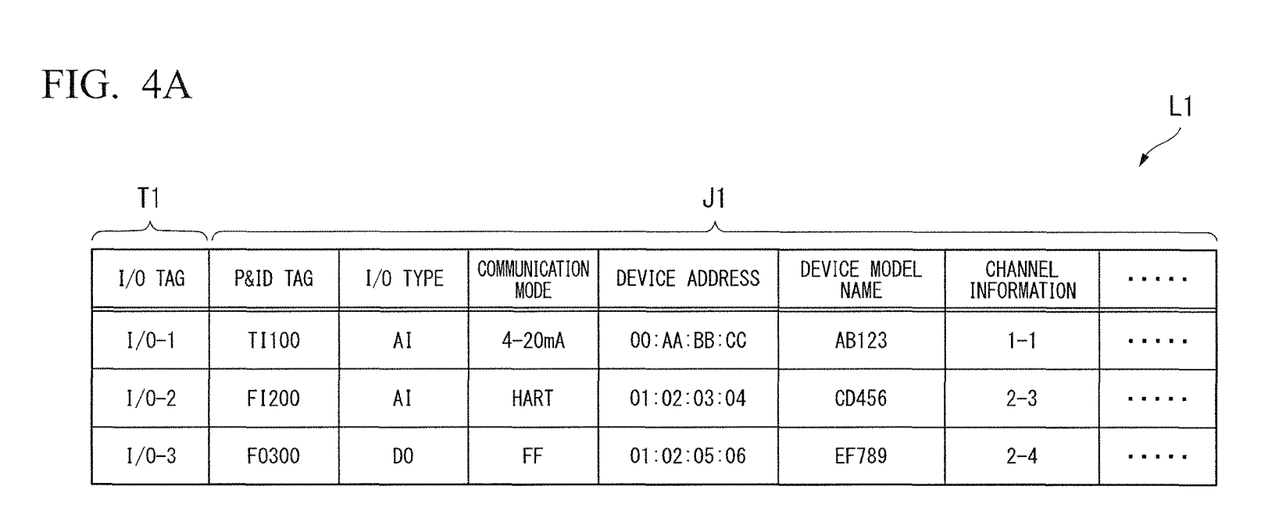
FIGS. 4A and 4B are diagrams illustrating an example of the I/O list to be used in the setting device in accordance with an embodiment of the present invention.
Figure 4B:
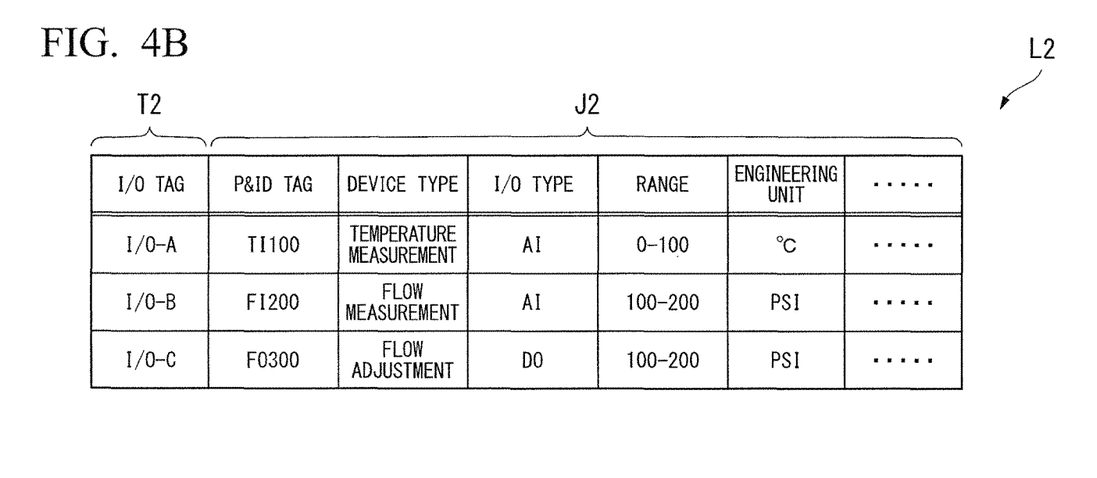

The above-described I/O lists L1 and L2 will be described. FIGS. 4A and 4B are diagrams illustrating an example of the I/O list to be used in the setting device in accordance with an embodiment of the present invention. FIG. 4A is a diagram illustrating an example of the I/O list L1, and FIG. 4B is a diagram illustrating an example of the I/O list L2. The I/O lists L1 and L2 are created by the engineering terminal 15 based on the design information stored in the instrumentation database 16 and are received by the setting device 17 as illustrated in FIG. 1.

As illustrated in FIG. 4A, an I/O tag T1, which is to be set in each I/O port P of the I/O module 12, and input/output information J1 of the field device 11, which is connected to the I/O port P, are associated with each other in the I/O list L1. In the example of FIG. 4A, the input/output information J1 of the field device 11 are "P & ID tag", "I/O Type", "communication method", "device address", "device model name", "channel information", and the like.

"P & ID tag" is a tag that is used to identify logically each I/O port P provided to the I/O module 12 in a plant piping and instrumentation diagram (P & ID). "I/O Type" is information indicating the type of input/output of the field device 11 (input of the analog signal (AI), output of the analog signal (AO), input of the digital signal (D1), output of the digital signal (DO), and the like.).

"Communication method" is information indicating the communication scheme used by the field device 11. In the example illustrated in FIG. 4A, a communication scheme using a 4-20 mA signal, a communication scheme conforming to HART (registered trademark), and a communication scheme conforming to FF (Foundation Fieldbus (registered trademark)) are illustrated. "Device address" is information indicating an address assigned to the field device 11. "Device model name" is information indicating the format of the field device 11 (model name). "Channel information" is information indicating the communication channel used in the field device 11.

As illustrated in FIG. 4B, the I/O list L2 is a list including the tag information T2 used in the controller 13 to identify each I/O port P of the I/O module 12 logically and input/output information J2 in the I/O port P, which are associated with each other. In the example illustrated in FIG. 4B, "P & ID tag", "Device type", "I/O type", "range", "engineering unit", and the like are illustrated as the output information J2 in the I/O port P.

"P & ID tags" and "I/O type" are similar to those included in the input/output information J1 of the I/O list L1. "Device type" is information indicating a function of the field device 11 connected to the I/O port P. In the example illustrated in FIG. 4B, a temperature measurement, a flow measurement, a flow rate adjustment, and the like are illustrated. "Range" is information indicating the size of the range of signals input/output by the I/O port P. "Engineering unit" is information indicating a unit for the signal input/output by the I/O port P. For example, if the signal input/output by the I/O port P is a signal indicating a temperature, the "engineering unit" is "° C.".

(Method of Building Process Control System)

Figure 5:
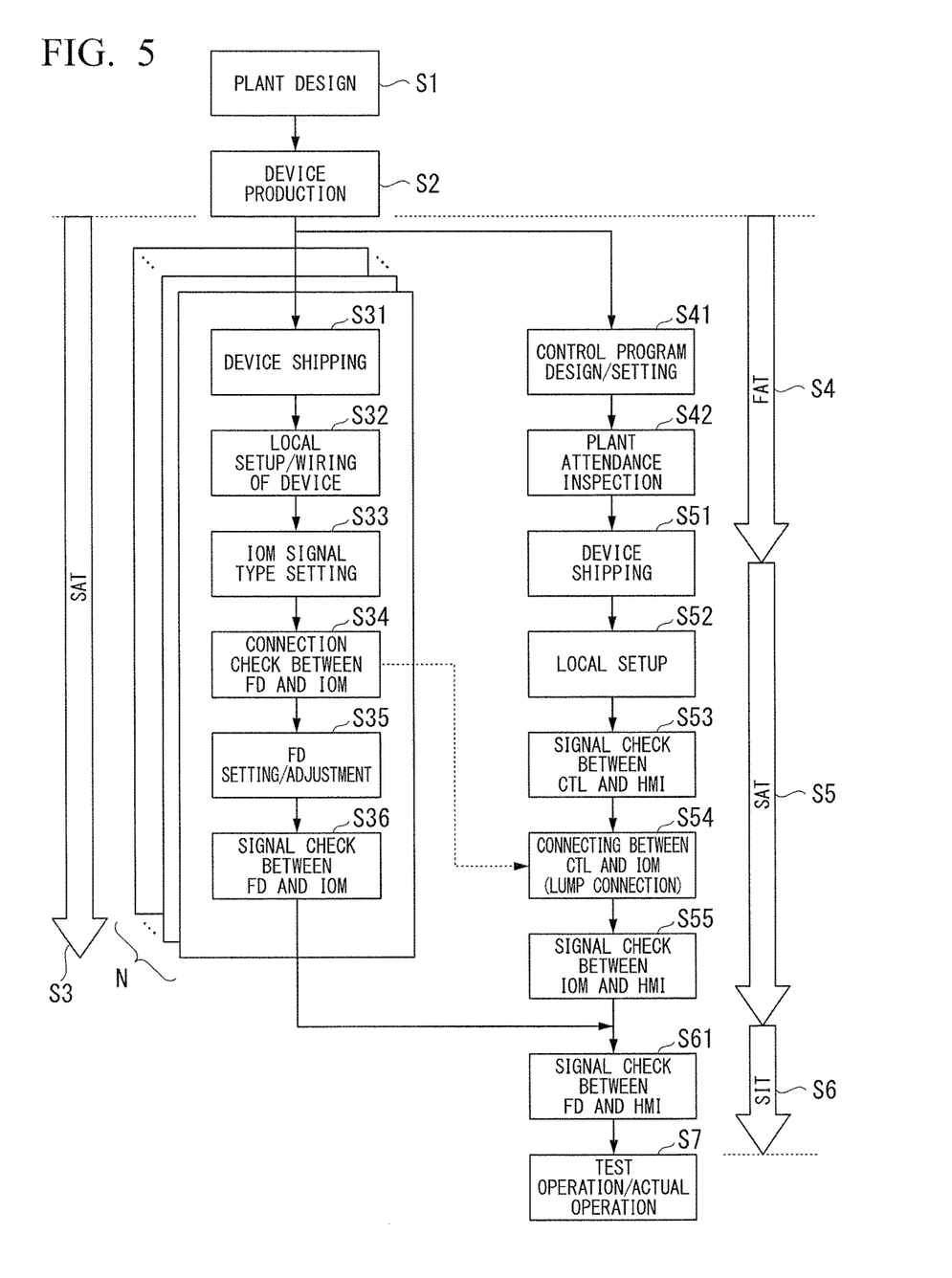
FIG. 5 is a flow chart illustrating a rough procedure for building the process control system of FIG. 1.

FIG. 5 is a flow chart illustrating a rough procedure for building the process control system of FIG. 1. As illustrated in FIG. 5, at first, a plant design that is a specification design of the plant including the process control system 1 to be built is performed (step S1). Next, productions of the devices (the field devices 11, the I/O module 12, the controller 13, or the like) constituting the process control system 1 of which specification is determined by the plant design are performed (step S2).

Then, among the produced devices, SAT (Site Acceptance Test) of the field device 11 and the I/O module 12 is performed (step S3). SAT is performed in parallel by using a plurality of setting devices 17 (or may be performed separately) in a state in which the I/O module 12 is not connected to the controller 13. For example, when N (N is an integer of 2 or more) setting devices 17 are used, as illustrated in FIG. 5, N SATs are performed in parallel. SAT may also be performed separately at staggered times.

Specifically, in SAT of the field device 11 and the I/O module 12, at first, the field device 11 and the I/O module 12 shipped from the factory (step S31) are installed in the field (site of the plant), and wirings are performed to be connected by a transmission line C1 (step S32: first step). Then, the I/O tag T1 is set to the I/O module 12 (referred to as "IOM" in FIG. 5) using the setting device 17, and the signal type input/output by the I/O module 12 is set (step S33: first step). Then, it is verified (checked) whether or not the connection between the field device 11 (referred to as "FD" in FIG. 5) and the I/O module 12 is normally performed using the setting device 17 (step S34).

Then, various settings and adjustments to the field device 11 are performed using the setting device 17 (step S35: first step). The settings made to the field device 11 are, for example, a setting of unique address (device address) to each field device 11, a setting of specific operating conditions for each field device 11, or the like. Finally, it is verified (checked) whether or not a signal is input/output normally between the field device 11 and the I/O module 12 using the setting device 17 (step S36). The procedure of the above-described setting and verification (steps S33 to S36) performed by using the setting device 17 will be described below.

Also, FAT (Factory Acceptance Test) for the controller 13 is performed (step S4) independently from the above-described SAT (Step S3) for the field device 11 and the I/O module 12. Specifically, the design and setting of the control program used by the controller 13 is performed to meet the specifications determined by the plant design of the process S1 (step S41: the second step). At this stage, the design of the control program is performed using the above-described I/O tag T2 (see FIG. 4B). When the design of the control program has been completed, the inspection of the controller 13 including the control program is performed (step S42).

When FAT for the controller 13 has been completed, SAT for the controller 13 is performed (step S5), independently from SAT for the field device 11 and the I/O module 12 described above (step S3). In SAT, the inspection in which the I/O module 12 is connected to the controller 13 is also performed.

Specifically, in SAT for the controller 13, at first, the controller 13, which is shipped from the plant (step S51), is mounted on the field (site of the plant) and made to be connected to the control network N (step S52). Then, it is verified (checked) whether or not the transmission/reception of signals between the controller 13 (referred to as "CTL" in FIG. 5) and the manipulation monitoring terminal 14 (referred to as "HMI" in FIG. 5) via the control network N is performed normally (step S53).

Then, the controller 13 is connected to the I/O module 12 via the cable C2 (step S54). Here, the I/O tag T1, which is set to the I/O port P of the I/O module 12 in step S33, is made correspondence with the I/O tag T2, which is used in the design of the control program in step S41, by using the setting device 17. If the connection between the field device 11 and the I/O module 12 or the like is changed according to local conditions in step S34, information indicating the contents of the changing is transmitted from the I/O module 12 to the controller 13 and the changing is reflected in the controller 13. Finally, it is verified (checked) whether or not transmission/reception of signals between the I/O modules 12 and the manipulation monitoring terminal 14 via the controller 13 and the control network N is normally performed (step S55).

When the above-described process is completed, SIT is performed that verifies whether or not the process control system 1 built on the plant works as designed as a whole (step S6). Specifically, it is verified (checked) whether or not transmission/reception of signals between the field device 11 and the manipulation monitoring terminal 14 via the I/O module 12, the controller 13, and the control the network N is performed normally (step S61). When SIT for the process control system 1 has normally completed, commissioning of the process control system 1, which is built on the plant or the like, is performed. When the commissioning is normally completed, operation of the process control system is shifted to a full-scale operation (step S7).

Figure 6:
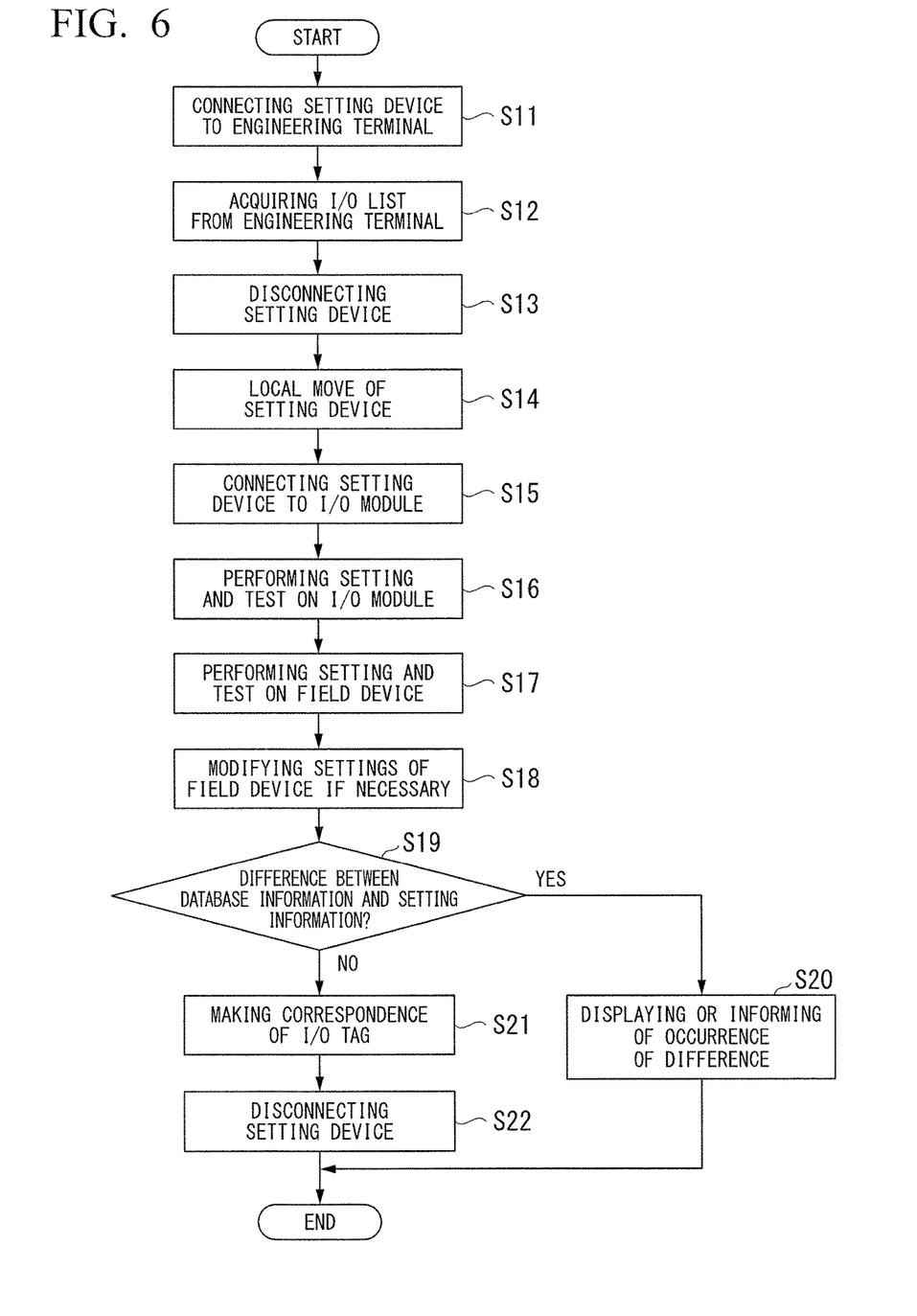
FIG. 6 is a flowchart illustrating the operation procedure of the various settings performed by using the setting device in accordance with an embodiment of the present invention.

FIG. 6 is a flowchart illustrating the operation procedure of the various settings performed by using the setting device in accordance with an embodiment of the present invention. When the operation is started, at first, the upper layer interface 31 of the setting device 17 is connected to the engineering terminal 15 (step S11). The setting device 17 may be connected directly to the engineering terminal 15 or may be connected indirectly to the engineering terminal 15 via the control network N.

Then, the I/O lists L1 and L2 created in the engineering terminal 15 are acquired by the setting device 17 and are stored in each database of the storage 33 (a device list mapping database DB1, a history database DB2, and a checklist database DB3) (step S12). The I/O list L2 (see FIG. 4B) created in the engineering terminal 15 is also used to design the control program used in the controller 13 in step S41 of FIG. 5.

Then, the setting device 17 is detached from the engineering terminal 15 (step S13). Specifically, if the setting device 17 is connected directly to the engineering terminal 15, the setting device 17 is detached from the engineering terminal 15. If the setting device 17 is indirectly connected to the engineering terminal 15, the setting device 17 is detached from the control network N. The setting device 17 that has been detached is moved to the site where the field device 11 and the I/O module 12 are installed in the step S32 of FIG. 5 (step S14).

Then, the lower layer interface 32 of the setting device 17 is connected to the setting device connection interface 23 of the I/O module 12 (step S15). Here, although the setting device 17 is connected to the I/O module 12, the controller 13 is not connected to the I/O module 12. Therefore, in the I/O module 12, the switch 27 is set to an OFF state and the switch 26 is set to an ON state by the switch 28.

Next, setting and testing for the I/O module 12 are performed based on the setting instruction from the setting device 17 (step S16: steps S33 and S34 of FIG. 5). Specifically, a process of setting the I/O tag T1 to each I/O port P is performed by the device setting adjustor 24 based on the setting instruction from the setting device 17. Then, setting relating to the input/output of the I/O port P using the I/O list L1 of FIG. 4A is performed by the device setting adjustor 24 based on the setting instruction from the setting device 17.

Also, the tester 25 performs a test to verify whether or not the connection between the I/O port P and the field device 11 is normally performed based on the verification instruction from the setting device 17.

Subsequently, setting and testing for the field device 11 are performed based on the setting instruction from the setting device 17 (step S17: steps S35 and S36 of FIG. 5). Specifically, the process of setting the unique address (device address) to each field device 11, the process of setting a specific operating condition for each field device 11, or the like is performed by the device setting adjustor 24 based on the setting instruction from the setting device 17 using the I/O list L1 of FIG. 4A. Also, the tester 25 performs a verification to verify whether or not signals are normally transmitted between the field device 11 and the I/O modules 12 based on the verification instruction from the setting device 17.

When the above-described procedures are completed, the operation of modifying the settings of the field device 11 as required is performed by the operator (step S18). This operation is performed in order to adjust and review the settings of the field device 11 and is accomplished by the operator operating the manipulation display 35 of the setting device 17. If there is no need to modify the settings of the field device 11, this operation is omitted.

Next, whether or not there is a difference between the information of each database stored in the storage 33 of the setting device 17 and the setting contents of the field device 11 (or the contents confirmed by the verification instruction) is determined by the control processor 34 (step S19). If it is determined that there is the above-described difference (when the determination result is "YES"), occurrence of the difference is displayed on the manipulation display 35 (step S20) and the series of processing ends. If the above-described difference occurs, occurrence of the difference may also be notified to the engineering terminal 15 after the setting device 17 is connected to the engineering terminal 15.

In contrast, if it is determined that there is no difference described above (when the determination result in step S19 is "NO"), a processing of making correspondence between the I/O tag T2 used in the controller 13 (see FIG. 4B) and the I/O tag T1 that is set to each I/O port P of the I/O modules 12 is performed by the I/O tag combiner 34d (step S21). Specifically, the I/O tags T1 and T2 are made correspondence with each other in reference to "P & ID tag" of FIG. 4 included in the I/O lists L1 and L2 as a standard.

Figure 7:
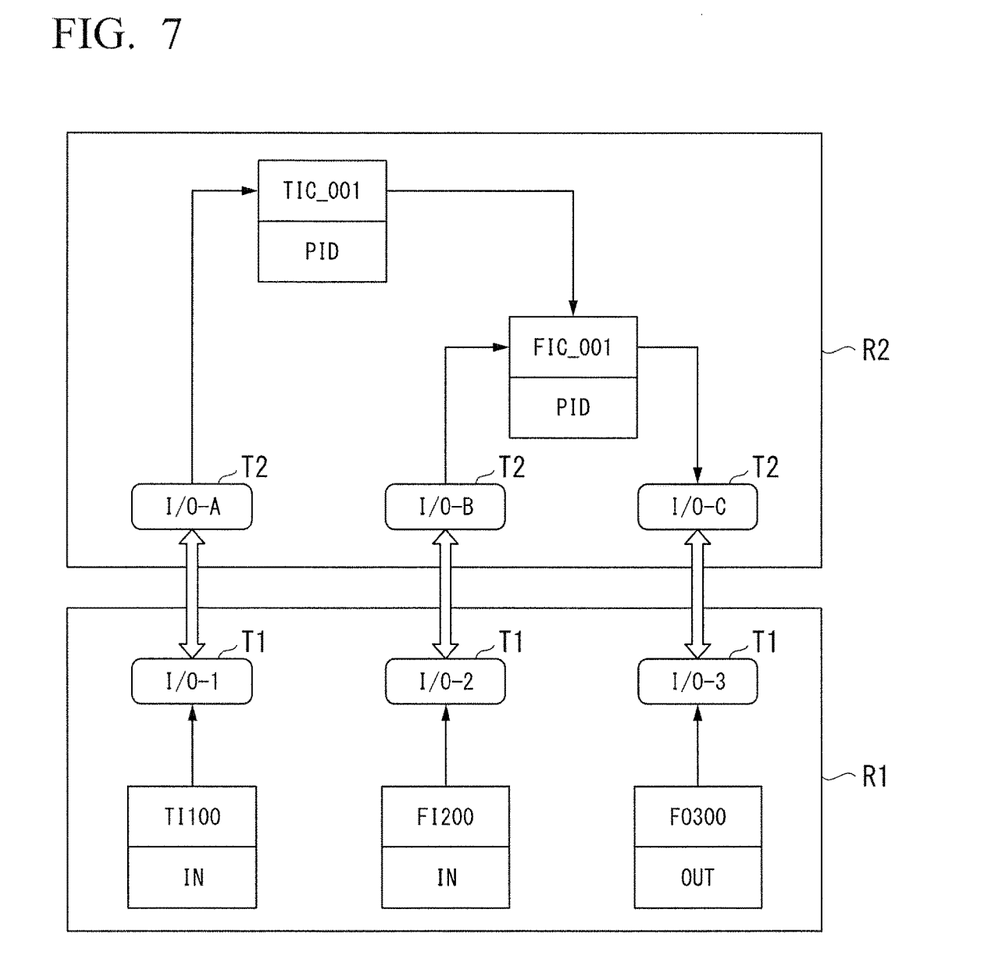
FIG. 7 is a view for explaining the correspondence of the I/O tag performed by the setting device in accordance with an embodiment of the present invention.

FIG. 7 is a view for explaining the correspondence of the I/O tag performed by the setting device in accordance with an embodiment of the present invention. In FIG. 7, the rectangular portion where the sign R1 is attached represents the I/O module 12 in which various settings are performed by using the I/O list L1 of FIG. 4A. Also, the rectangular portion where the sign R2 is attached represents the controller 13 that is designed by using the I/O list L2 of FIG. 4B.

In the I/O list L1 of FIG. 4A, "P & ID tag" such as "TI100", "FI200" and "FO300" is associated with the I/O tag T1 such as "I/O-1", "I/O-2" and "I/O-3". Also, in the I/O list L2 of FIG. 4B, "P & ID tag" such as "TI100", "FI200" and "FO300" is associated with the I/O tag T2 such as "I/O-A", "I/O-B" and "I/O-C".

Therefore, the I/O tag combiner 34d makes correspondence between the I/O tag T1 such as "I/O-1" and the I/O tag T2 such "I/O-A" in reference to "P & ID Tag" as standard as illustrated in FIG. 7. Also, the I/O tag combiner 34d makes correspondence between the I/O tag T1 such as "I/O-2" and the I/O tag T2 such as "I/O-B" and between the I/O tag T1 such as "I/O-3" and the I/O tag T2 such as "I/O-C". By making these correspondences, the input/output information J1 of the I/O list L1 is coupled with the input/output information J2 of the I/O list L2. Thereby, the controller 13 can control the field device 11 via the I/O module 12.

When the above-described operations are completed, the setting device 17 is detached from the I/O module 12 (step S22) and the series of operations of FIG. 6 are competed. When the series of operations of FIG. 6 are completed, the I/O module 12 whose setting has been completed is connected to the controller 13 (step S54 of FIG. 5). Here, although the controller 13 is connected to the I/O module 12, the setting device 17 is not connected to the I/O module 12. Therefore, in the I/O module 12, the switch 26 is set to an OFF state and the switch 27 is set to an ON state by the switch 28.

Then, it is verified whether or not signals are transmitted normally between the I/O module 12 and the manipulation monitoring terminal 14 (step S55 of FIG. 5) and whether or not signals are transmitted normally between the field device 11 and the manipulation monitoring terminal 14 (step S56 of FIG. 5). Thereafter, commissioning of the process control system 1 is performed and operation of the process control system is shifted to a full-scale operation (step S7 in FIG. 5).

As described above, in this embodiment, the I/O module 12 for connecting a plurality of field devices 11 to the controller 13 includes the setting device connection interface 23 that allows connection with the connection setting device 17, and the I/O tag T1 is set to each I/O port P based on the setting instruction from the setting device 17 input via the setting device connection interface 23. Then, setting related to input/output of the I/O port P is performed by using an I/O tag T1 based on the setting instruction from the setting device 17, and setting of the field device 11 is performed by using the I/O tag T1. Thereby, even if the I/O module 12 is not connected to the controller 13, it is possible to perform setting and adjustment to the field device 11 and the I/O modules 12, connection test between the field device 11 and the I/O module 12, or the like.

Further, in this embodiment, design and settings of the control program used in the controller 13 are performed by using the I/O tag T2 that is different from the above-described I/O tag T1, and the setting device 17 makes correspondence between the I/O tag T1 set to the I/O port P of the I/O module 12 and the I/O tag T2 used in design of the controller 13. Therefore, SAT for the field device 11 and the I/O module 12 (step S3 in FIG. 5) and FAT for the controller 13 (step S4 in FIG. 5) can be performed in parallel. Further, part of SAT for the controller 13 (step S5 in FIG. 5) can be performed in parallel.

Thus, it is possible to shorten the time required for FAT, SAT, and SIT, and as a result, it is possible to accelerate the full-scale operation of the plant including the process control system 1. That is, it is possible to shorten the time required for the construction of the process control system than in the conventional art. Although depending on the scale of the plant, it is possible to shorten the time required for completing the above-described three procedures (FAT, SAT, and SIT) about one month.

While the I/O module, the setting device, and the method of building the process control system according to an embodiment of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description.

For example, in the above-described embodiment, to facilitate understanding, the three interfaces of the I/O module 12 (the I/O port interface 21, the control layer interface 22, and the setting device connection interface 23) are explicitly divided. However, these may be achieved by physically the same interface. However, from security issues, it is desirable that these are logically separated by protocols, access rights, or the like. This is also true for the upper layer interface 31 and the lower layer interface 32 of the setting device 17.

Moreover, it is also possible to automate the series of operations of FIG. 6. Specifically, by using the I/O lists L1 and L2 obtained from the engineering terminal 15, a list of items for inspection, settings, and verification to be performed for the field device 11 and the I/O module 12 is prepared in advance in the setting device 17. Then, for example, the checker 34*c* refers to the list of these items, sequentially performs a quality judgment of the inspection, the settings, the verification, or the like of the field device 11 and the I/O module 12, sequentially verifies their progress state, and sequentially stores in the history database DB2 information indicating the determination result and the progress state to which time information is added as status information. It is preferable that a comment or the like can be attached to the information stored in the history database DB2.

If the information stored in the history database DB2 of the plurality of setting device 17 are integrated into the engineering terminal 15, it is possible to recognize progress information of inspection, settings, and verification of the entire (or in the target range). Here, the information to be integrated into the engineering terminal 15 are preferable to be limited only to the information in which there is a change of status in order to reduce a communication load and an unavailable processing. Also, the integration of the detailed status of each field device 11 may be performed in the setting device 17, and only the summary of the status may be notified to the engineering terminal 15.

Here, when detecting the change of status, by having time information indicating the time when the data is changed, it is possible to prevent a situation such that the setting value is incorrectly changed to a previous setting value. The above-described progress information may be notified to an operator, a manager or the like by e-mail. When the inspection, the verification, or the like is completed, the test result (for example, a measurement error, or the like) of the field device 11 or the like may be stored in the setting device 17 or may be notified to the engineering terminal 15.

Also, before the processing in the I/O tag combiner 34*d* is performed, the engineering terminal 15 may verify (if necessary, modify) the difference between the original design information and the field data that the setting device 17 has, and the processing in the I/O tag combiner 34*d* may be performed after the verification. In addition, the setting device 17 or the engineering terminal 15 may have a function of creating and publishing a document report for the result of the inspection, the settings, the verification, or the like.

What is claimed is:

1. An I/O module comprising:
a first interface including connectors and being connected to one or more field devices;
a second interface connected to a controller that controls the one or more field devices;
a third interface connected to an external setting device that outputs a setting instruction;
a setting adjustor configured to set tag information, which identifies each of the connectors, to each of the connectors based on the setting instruction input from the setting device via the third interface; and
an interceptor configured to block an instruction input from the setting device via the third interface and to connect the one or more field devices connected to the first interface with the controller connected to the second interface, based on an instruction input from the controller via the second interface, the interceptor being configured to block an instruction input from the controller via the second interface and to connect the setting device connected to the third interface with the one or more field devices connected to the first interface, based on an instruction input from the setting device via the third interface, the interceptor being configured to exclusively block the instruction input from the setting device via the third interface and the instruction input from the controller via the second interface.

2. The I/O module according to claim 1, wherein the setting adjustor performs a setting relating to an input/output of each of the connectors by using the tag information based on the setting instruction input from the setting device via the third interface.

3. The I/O module according to claim 2, wherein each of the connectors is set to perform one of an input of an analogue signal from the field device, an output of an analogue signal to the field device, an input of a digital signal from the field device, and an output of a digital signal to the field device, based on the setting instruction input from the setting device.

4. The I/O module according to claim 1, wherein the setting adjustor performs a setting of the field device connected to the connector, to which the setting has been performed, by using the tag information based on the setting instruction input from the setting device via the third interface.

5. The I/O module according to claim 4, further comprising:
a tester configured to verify a state of the field device, to which the setting has been performed, by using the tag information based on a verification instruction input from the setting device via the third interface.

6. The I/O module according to claim 5, further comprising:
a first switch that switches a connection between the second interface and the setting adjustor and between the second interface and the tester to an ON state or an OFF state;
a second switch that switches a connection between the third interface and the setting adjustor and between the third interface and the tester to an ON state or an OFF state; and
an on-off setting adjustor that sets one of the first switch and the second switch to an ON state and the other of the first switch and the second switch to an OFF state, based on an instruction input from the controller via the second interface or an instruction input from the setting device via the third interface.

7. The I/O module according to claim 1, further comprising:
a memory that stores the tag information that has been set to each of the connectors.

8. A setting device connected to the I/O module according to claim 1, the setting device comprising:
- a lower interface connected to the third interface of the I/O module;
- a storage that stores setting information relating to a transmission between the field device and the I/O module; and
- an instructor that instructs a setting of at least one of the I/O module and the field device via the lower interface by using the setting information stored in the storage.

9. The setting device according to claim 8, further comprising:
- a checker that verifies a state of the field device, which is connected to the I/O module, via the lower interface.

10. The setting device according to claim 9, wherein
the storage further stores check information that defines an item to be verified about the field device and a procedure, and
the checker verifies the state of the field device according to the check information stored in the storage.

11. The setting device according to claim 9, wherein the checker makes history information by adding time information, which indicates a time when the state of the field device has been verified, to verification information, which has been acquired by verifying the state of the filed device, and stores the history information in the storage.

12. The setting device according to claim 10, wherein the checker controls displaying progress information that indicates a verification state of the field device or notifying an engineering terminal, which generates the setting information, of the progress information.

13. The setting device according to claim 8, wherein the setting information includes:
- a first setting information in which the tag information, which is set to each of the connectors arranged on the first interface of the I/O module, is made to correspond with input/output information of the field device connected to one of the connectors; and
- a second setting information in which tag information, which is used in the controller to logically identify each of the connectors, is made to correspond with input/output information of the one of the connectors.

14. The setting device according to claim 13, further comprising:
- a combiner that combines the input/output information of the one of the connectors and the input/output information of the field device, by creating correspondence between the tag information included in the first setting information and the tag information included in the second setting information.

15. The setting device according to claim 8, further comprising:
- an upper interface connected to an upper device or an off-line device,
- wherein the setting information to be stored in the storage is acquired from the upper device or an off-line device via the upper interface.

16. A method of building a process control system that controls an industrial process, the method comprising:
- a first step of installing the I/O module according to claim 1 and the field device in a field and installing wirings between them, and setting the I/O module and the field device by using the setting device connected to the I/O module.

17. The method according to claim 16, wherein, in the first step, each of a plurality of I/O modules connected to field devices is connected to the setting device, and settings of the plurality of I/O modules and settings of the field devices are performed together in parallel or individually.

18. The method according to claim 16, further comprising:
- a second step of designing the controller that controls the field device by using tag information for logically identifying each of the connectors arranged in the first interface of the I/O module, the second step being performed independent from the first step; and
- a third step of installing the controller designed in the second step in the field and connecting the controller to the I/O module, and creating correspondence between tag information used in the controller and tag information that has been set in the I/O module.

19. An I/O module including a first interface that includes a plurality of connectors and is connected to one or more field devices and connecting the one or more field devices to a controller, the I/O module comprising:
- a second interface connected to an external setting device; and
- a setting adjustor that sets tag information, which logically identifies each of the connectors, to each of the connectors arranged in the first interface based on setting instruction input from the setting device via the second interface,
- wherein the setting adjustor sets the one or more field devices connected to a connector on which setting of the tag information has been performed, by using the tag information based on setting instruction input from the setting device via the second interface,
- wherein the I/O module further comprises an interceptor configured to block an instruction input from the setting device via the second interface and to connect the one or more field devices connected to the first interface with the controller, based on an instruction input from the controller, the interceptor being configured to block an instruction input from the controller and to connect the setting device connected to the second interface with the one or more field devices connected to the first interface, based on an instruction input from the setting device via the second interface, the interceptor being configured to exclusively block the instruction input from the setting device via the second interface and the instruction input from the controller.

20. A setting device connected to the I/O module according to claim 19, the setting device comprising:
- a lower interface connected to the second interface of the I/O module;
- a storage that stores setting information relating to a transmission between the one or more field devices and the I/O module; and
- an instructor that instructs a setting of at least one of the I/O module and the one or more field devices via the lower interface by using the setting information stored in the storage.

21. A method of building a process control system that controls an industrial process, the method comprising:
- a first step of installing an I/O module and one or more field devices in a field and installing wirings between them, and setting the I/O module and the one or more field devices by using an external setting device connected to the I/O module, the I/O module including a first interface that includes a plurality of connectors each of which is connected to the one or more field devices, a second interface connected to the setting device, and a setting adjustor that sets tag information, which logically identifies each of the connectors, to each of the connectors arranged in the first interface based on setting instruction input from the setting device via the second interface, the I/O module connecting the one or more field devices to a controller;

a second step of blocking, by the I/O module, an instruction input from the setting device via the second interface and connecting the one or more field devices connected to the first interface with the controller, based on an instruction input from the controller;

a third step of blocking, by the I/O module, an instruction input from the controller and connecting the setting device connected to the second interface with the one or more field devices connected to the first interface, based on an instruction input from the setting device via the second interface; and a fourth step of exclusively blocking, by the I/O module, the instruction input from the setting device via the second interface and the instruction input from the controller.

* * * * *